(12) United States Patent
Higgins et al.

(10) Patent No.: US 8,142,548 B2
(45) Date of Patent: Mar. 27, 2012

(54) METHOD AND APPARATUS FOR ENHANCED MERCURY REMOVAL

(75) Inventors: Brian S. Higgins, Walnut Creek, CA (US); Klaus Oehr, Surry (GB); Eric Fischer, Orinda, CA (US)

(73) Assignee: Nalco Mobotec, Inc., Naperville, IL (US)

( * ) Notice: Subject to any disclaimer, the term of this patent is extended or adjusted under 35 U.S.C. 154(b) by 455 days.

(21) Appl. No.: 12/310,586

(22) PCT Filed: Jun. 19, 2007

(86) PCT No.: PCT/US2007/071579
§ 371 (c)(1),
(2), (4) Date: Oct. 28, 2009

(87) PCT Pub. No.: WO2007/149867
PCT Pub. Date: Dec. 27, 2007

(65) Prior Publication Data
US 2010/0031818 A1    Feb. 11, 2010

Related U.S. Application Data

(60) Provisional application No. 60/814,810, filed on Jun. 19, 2006.

(51) Int. Cl.
*B01D 53/08* (2006.01)
*B01D 53/64* (2006.01)

(52) U.S. Cl. .............................. 95/107; 95/134; 110/345
(58) Field of Classification Search ................... 95/107, 95/134; 423/210; 110/345, 203, 216
See application file for complete search history.

(56) References Cited

U.S. PATENT DOCUMENTS

| | | | |
|---|---|---|---|
| 4,451,351 A | 5/1984 | Porter | |
| 6,521,021 B1 | 2/2003 | Pennline | |
| 6,808,692 B2 | 10/2004 | Oehr | |
| 6,953,494 B2 | 10/2005 | Nelson, Jr. | |
| 7,713,503 B2 * | 5/2010 | Maly et al. | 423/210 |
| 7,776,780 B1 * | 8/2010 | Granite et al. | 502/181 |
| 2005/0147549 A1 * | 7/2005 | Lissianski et al. | 423/210 |
| 2008/0202396 A1 * | 8/2008 | Aradi et al. | 110/345 |

* cited by examiner

*Primary Examiner* — Frank Lawrence, Jr.
(74) *Attorney, Agent, or Firm* — MacCord Mason PLLC

(57) ABSTRACT

A method and apparatus for treating a coal combustion flue gas. In one embodiment, the method includes injecting a halogen into a flue gas, and injecting partially combusted, carbon enriched alkaline coal ash solid particles into the flue gas ahead of a particulate collection device. In another embodiment, the method includes exposing partially combusted, carbon enriched alkaline coal ash solid particles to a halogen containing atmosphere, and injecting the halogen atmosphere treated alkaline carbon containing solid particles into the flue gas ahead of a particulate collection device.

48 Claims, 2 Drawing Sheets

METHOD AND APPARATUS FOR ENHANCED MERCURY REMOVAL

This application is a national stage entry of PCT application No. PCT/US2007/071579, filed on Jun. 19, 2007, which claims priority from Provisional Application No. 60/814,810, filed on Jun. 19, 2006.

FIELD OF THE INVENTION

The present invention relates generally to a method and apparatus for reducing the mercury emissions of flue gases, and more particularly to a method and apparatus for reducing mercury emissions created by burning particular types of coal in coal-fired power plants.

BACKGROUND

Because of the harm it causes, and because of government regulations, numerous attempts have been made to capture mercury prior to its release from coal-fired power plants.

For example, Oehr, in U.S. Pat. No. 6,808,692, the contents of which is hereby incorporated in its entirety by reference, describes the use of molecular halogens such as chlorine gas ($Cl_2$) to convert elemental mercury ($Hg_0$) to mercuric chloride ($HgCl_2$). Such a conversion is desirable because mercuric chloride is absorbable by alkaline solids, especially solids containing calcium oxide (CaO) or calcium hydroxide ($Ca(OH)_2$). Typically, such collection is achieved ahead of particulate collection devices such as baghouses or electrostatic precipitators. Oehr's technique, however, is not equally successful for all types of coal.

For example, Oehr's technique was not completely effective for mercury removal when using 12 to 25 ppmv molecular chlorine injection into the flue gas obtained from full combustion of subbituminous and lignite coals. Such coals generate fly ash on partial or full combustion which are alkaline as evidenced by their ability to raise pH of their water-to-fly ash mixtures to values above 7. The applicants consider various ranks and forms of lignite and subbituminous coals to be coal for the purposes of this invention. Lignite and subbituminous coals represent almost half of Canadian and United States coal combustion in power plants. Other techniques for reducing mercury release from the burning of lignite coals are similarly ineffective or have shortcomings.

For example, Pennline et al., in U.S. Pat. No. 6,521,021, the contents of which is hereby incorporated in its entirety by reference, describe a Thief process, which includes the use of partially combusted coal solids to effect mercury removal from flue gas ahead of particulate collection devices such as baghouses or electrostatic precipitators. Applicants have examined Pennline et al.'s technique and found it to have deficiencies for mercury removal when using partially combusted lignite and subbituminous coal solids. Because lignite and subbituminous coals represent such an important energy source, and because reducing the amount of mercury released into the environment is so important, applicants have developed a method and apparatus for decreasing the amount of mercury released into the environment from combusting lignite or subbituminous coals is needed.

Nelson in U.S. Pat. No. 6,953,494 describes the use of a brominated "carbonaceous" substrate to effect mercury control combustion flue gas. This invention suffers from the following serious disadvantage: carbon, especially expensive powdered activated carbon, represents the majority component of the "carbonaceous" material e.g. "preferably powdered activated carbon" (page 6 lines 10-11). Also see also page 7, lines 13-14 "The important features of the sorbent substrate material are that it is significantly composed of carbon".

Excessive use of carbon is undesirable due to contamination of resulting fly ash in blended cement applications especially outdoor winter applications due to freeze-thaw characteristics or undesirable coloring of the blended cement.

SUMMARY

The present inventions teach a method and apparatus for successfully removing mercury from coals, including lignite and subbituminous coals. In one embodiment of the present inventions, the method includes injecting a halogen, which may include a molecular halogen or an atomic or molecular halogen precursor, into a flue gas. The method also includes injecting carbon enriched alkaline coal ash particles derived from partial coal combustion into the flue gas ahead of a particulate collection device. As used herein, carbon enriched alkaline coal ash particles are particles having less than about 50% by weight carbon content and greater than about 50% by weight alkaline ash content, even more preferably less than about 50% by weight carbon content and more than about 60% by weight alkaline ash content. Preferred examples of carbon enriched alkaline coal ash particles have about 20% to about 40% by weight carbon and about 55% to about 80% by weight alkaline ash. Even more preferred examples have about 30% to about 40% by weight carbon and about 60% to about 80% by weight alkaline ash.

The injection steps may occur successively or concurrently, and if successively, either step may precede the other. The carbon enriched alkaline coal ash particles derived from partial coal combustion are preferably obtained using Thief carbon methods, but others may prefer to practice the present invention using semi-combusted coal, e.g., coal partially combusted in a fluidized bed.

In another embodiment of the present inventions, the method includes exposing carbon enriched alkaline coal ash particles derived from partial coal combustion to a halogen containing atmosphere. The method also includes injecting the halogen atmosphere treated carbon enriched alkaline coal ash particles derived from partial coal combustion into said flue gas ahead of a particulate collection device, thereby adsorbing at least a portion of the mercury.

These and other aspects of the present invention will become apparent to those skilled in the art after a reading of the following description of the preferred embodiments when considered with the drawing.

DETAILED DESCRIPTION OF PREFERRED EMBODIMENTS

Figure 1:
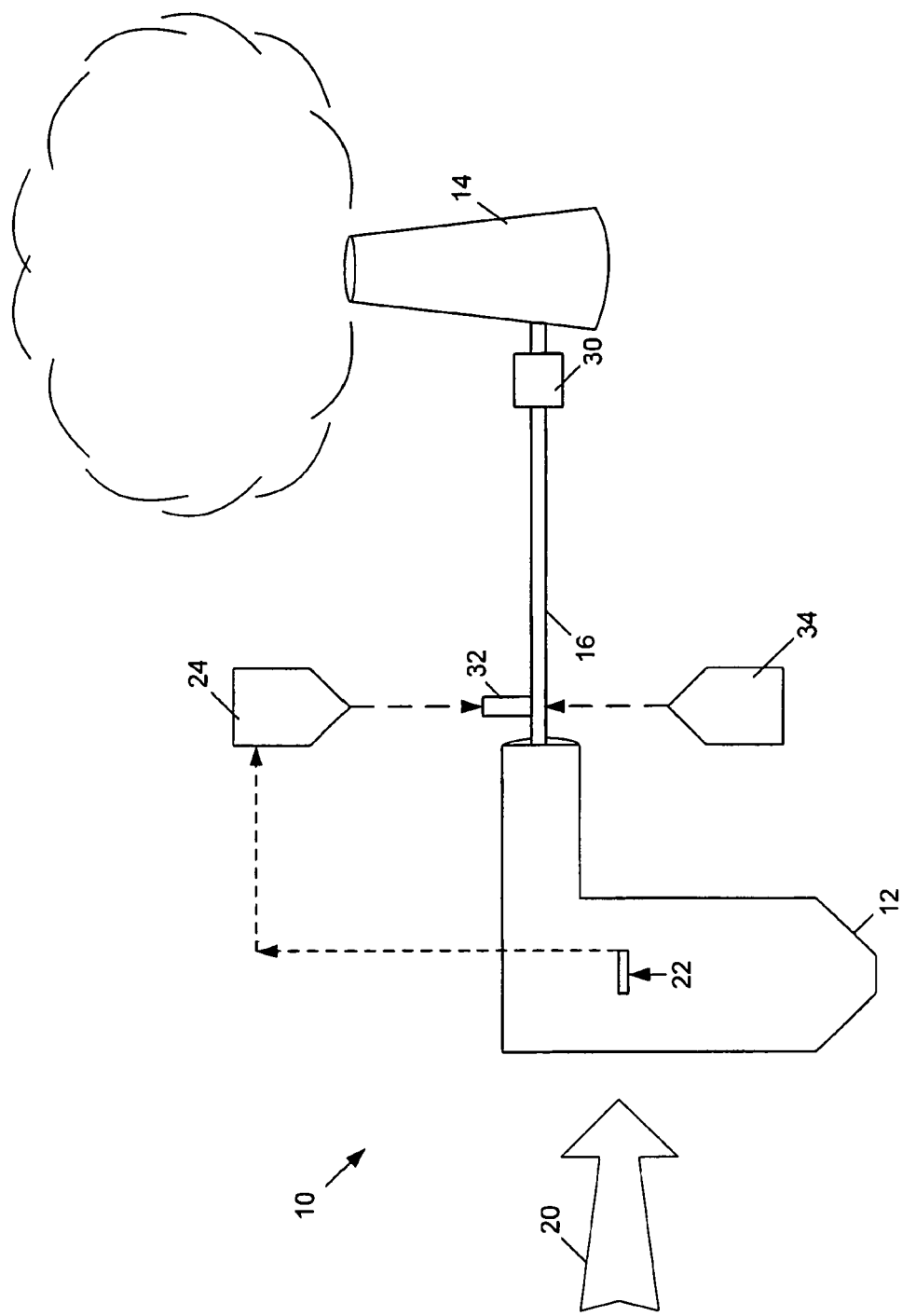
FIG. 1 shows a schematic of an apparatus constructed according to one embodiment of the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

FIG. 1 shows one embodiment of a coal-fired power plant 10 implementing one embodiment of the present inventions.

Power plant 10 includes combustion chamber 12. Combustion chamber 12 is connected to stack 14 through duct work 16. Flue gas created by the combustion of coal travels down duct work 16 and exists through stack 14.

Using embodiments of the current invention, lignite or subbituminous coals 20 are injected into combustion chamber 12. The high temperatures in the chamber 12 activates the coal and imparts an alteration within the coal, at this stage, however, the activated coal has little affinity for mercury due to the high temperatures in the chamber. Prior to fully burning, a portion of this activated coal is extracted from combustion chamber by thief 22. The size of the extracted coal particles can be similar to the size of coal that was injected into the combustion chamber 12. Its size may also be changed due to its treatment in the combustion chamber.

Thief 22 may be a hollow lance inserted into combustion zone 12, through which suction is applied. Suction may be created by a gas pump (not shown) or vacuum system, eductor, etc. Thief 22 could be comprised of a variety of construction materials, including stainless steels. Thief 22 may use a cooling device when located in the combustion chamber 12 in order to reduce further oxidation of the solids. For example, thief 22 could have a water, air, or steam-cooled chamber that is jacketed by a layer of high-temperature, highly reflective material to reduce heat transfer while the particles are withdrawn.

In operation, thief 22 draws a partially combusted carbon enriched alkaline coal ash particle derived from partial coal combustion and gas mixture out of the combustion chamber 12 and through a gas-solid separator 24 such as a cyclone separator (gas portions may be re-channeled into the system at any desired point, or alternatively, they may be exhausted outside of the system).

The carbon enriched alkaline coal ash derived from partial coal combustion is injected into the duct work 16 of the power plant 10. This injection can occur anywhere in between combustion chamber 12 and particulate collection device 30. Preferably, injection is achieved by injector 32, and preferably where the temperature is about 400° F. or less. Injector 32 may be, for example, a feed screw or an eductor, with air as the motive gas. The thermally activated carbon enriched alkaline coal ash particle derived from partial coal combustion stream may be cooled prior to injection to preserve the reactivity of the solids and to prevent further oxidation.

The carbon enriched alkaline coal ash solid particles derived from partial coal combustion are preferably derived from the combustion of lignite or subbituminous coal. In other embodiments, the carbon enriched alkaline coal ash particles derived from partial coal combustion are those derived from the fusion of non-alkaline coal ash (e.g. bituminous coal as) with alkali and an alkali flux (e.g. see Oehr et al U.S. Pat. No. 6,250,235 for description of alkali fluxing of non-alkaline coal ash). In other embodiments still, the carbon enriched alkaline coal ash solid particles are derived from partially combusted coal, e.g. lignite or subbituminous coal, which may have been partially combusted, for example, in a fluidized bath.

Additionally, in many embodiments of the present invention, a halogen is injected into flue gas in duct work 16 by injector 34. As used herein, halogen may include a molecular halogen or an atomic or molecular halogen precursor. Molecular halogen or molecular or atomic halogen precursors are preferably chlorine, bromine, iodine or fluorine, or mixtures thereof, and are, more preferably, chlorine or bromine, or mixtures thereof. The molecular or atomic halogen precursor may also contain a halide, or a hypohalite. The halide may be chloride, bromide or iodide or mixtures thereof. The hypohalite may be hypochlorite, hypobromite or hypoiodite or mixtures thereof.

In other embodiments, the carbon enriched alkaline coal ash solid particles derived from partial coal combustion are exposed to a halogen containing atmosphere. Such exposing could be achieved prior to or in injector 32. Following exposure, the halogen treated carbon enriched solid coal ash particles derived from partial coal combustion are injected into the flue gas ahead of a particulate collection device, thereby adsorbing at least a portion of the mercury.

Following injection, the flue gas moves to particle collection device 30, which is the location where mercury containing particles are removed prior to flue gas release from stack 14. In many embodiments, particle collection device 30 is an electrostatic precipitator, but others, in other embodiments may prefer a baghouse or fabric filter. Some may also consider particle collection device to be a flue gas desulphurization system FGD. Any combination of the above systems would be considered to be within the scope of the present invention.

Figure 2:
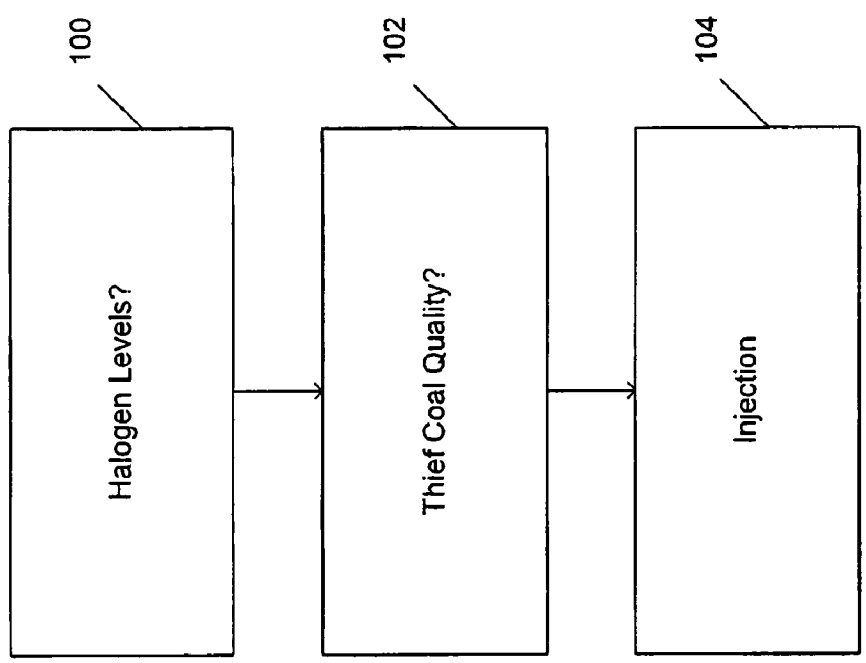
FIG. 2 is a block diagram representation of steps of another embodiment of the present invention.

FIG. 2 is a block diagram representation of another embodiment of the present inventions of treating coal combustion flue gas containing mercury. Block 100 represents evaluating coal to be burned for halogen levels, which preferably includes evaluating for chlorine levels, see for example, D2361-02 Standard Test Method for Chlorine in Coal. Block 102 represents evaluating quality of thief coal, which preferably includes evaluating alkalinity, e.g., as indicated by pH, and alkaline ash content. Coal quality can be inclusive of other parameters as well, e.g., carbon measurement, BET surface area measurement, etc. Blocks 100 and 102 may be performed prior to thiefing, e.g. based on the composition of the coal before it is placed into the combustion chamber, or after thiefing, after the heat activation. Block 104 represents injecting a halogen and carbon enriched alkaline solid coal ash particles derived from partial coal combustion into flue gas ahead of a particulate collection device. This step is performed if it has been determined that halogen amounts are below a predetermined level, e.g., a level that allows for effective mercury removal, and after it has been determined that coal ash is of a certain quality, e.g. alkaline or acidic with pockets of alkaline ash. In other embodiments, it may be desirable to correlate the injection of halogen levels to the inherent halogen levels present in the coal. For example, if halogens, e.g., bromine, are present in the coal and produce flue gas halogen concentration at about 0.5 ppmv, in may be desirable to inject bromine in amount sufficient to bring total halogen concentration up to about 4 ppmv or higher. Somewhat similarly, depending on the inherent chlorine levels in coal, chlorine may be injected in an amount sufficient to bring flue-gas halogen concentration up to about 25 ppmv, up to about 20 ppmv, up to about 15 mmpv, or up to about 12 ppmv. In other embodiments, it may also be desirable to inject a mix of halogens, and such embodiments are considered to be within the scope of the present invention.

The present invention also encompasses other embodiments. For example, the present invention also includes a method for removing mercury from a flue gas created from the burning of lignite or subbituminous coals in a coal fired power plant. In this embodiment, the method includes injecting a pulverized coal and air mixture into a combustion chamber. After injection, a stream of semi-combusted pulverized coal and gas is extracted before the semi-combusted coal reaches the burner. Extracting may be accomplished by inserting a hollow lance into the combustion zone and by applying suction to that lance. Because it may be difficult to regulate combustion zone temperatures, some may perform embodiments of the present invention with some success by extracting at a variety of temperatures. Applicants find it preferable however to extract from areas of the combustion zone having temperatures ranging from about 1000° F. to about 3000° F., more preferably about 1000° F. to about 2000° F., and more preferably still about 1000° F. to about 1500° F. The coal and gas components of the stream are separated into a gas recycle stream and a thermally activated sorbent stream. Separating may be achieved, for example, by directing said stream of semi-combusted pulverized coal and gases into a gas-solid separator. The sorbent stream is cooled to a desired level. A halogen is injected into the flue gas. The thermally activated sorbent and the halogen are contacted with the flue gas at a location downstream from the combustion chamber. Contacting may be achieved by using a feed device to inject the sorbent and halogen into a duct containing the flue gas. Contacting may be performed at a variety of temperatures, for example, where a flue gas temperature is in a range of up to about 400° F. More preferably, temperatures will be below about 350° F., and even more preferably below about 300° F. Because, however, temperatures at a given power plant may be difficult to adjust at this stage in the cycle, some may practice the present invention with higher temperatures, and such practices may be within the scope of certain embodiments of the present invention. A particle collection device is then used to collect the thermally activated sorbent and halogen mixture containing an amount of mercury removed from the flue gas.

The following experiments demonstrate the efficacy and utility of the present invention.

Experiment 1

It has been discovered that the use of carbon enriched alkaline coal ash solids, such as partially combusted Canadian lignite coal ash obtained using the Pennline et al technique (24 grams/hr), in combination with a halogen containing atmosphere e.g. 12-25 ppmv molecular chlorine gas allowed up to 60% mercury removal from flue gas across a fiberglass baghouse at a Canadian lignite coal firing rate of ~25.6 lbs/hr. Injection was prior to baghouse at about 300° F.

Experiment 2

It has been discovered that the use of brominated carbon enriched alkaline coal ash solids, such as partially combusted Canadian lignite coal ash ("Thief carbon") obtained using the Pennline et al technique at a dose of 1.0 lb of brominated and unbrominated carbon per MMacf of mercury containing lignite coal combustion flue gas resulted in 74% and 65% mercury removal respectively from the flue gas across a fiberglass baghouse at an average baghouse temperature of 281° F. The brominated carbon containing alkaline solids contained 4% bromine by weight. The brominated carbon containing alkaline solids sample was prepared by putting Thief carbon derived from Canadian lignite and liquid bromine in separate glass bottles in an enclosed container while stirring the Thief carbon with a magnetic stirrer and exposing it to bromine vapour from the liquid bromine. Carbon content of the Thief carbon was ~39% by weight (unbrominated basis) which indicates that it contained ~61% by weight of alkaline ash i.e. the majority of its weight. Mercury removal through the baghouse without Thief carbon addition was ~30%. The pH of the unbrominated alkaline carbon containing solids were ~11 which demonstrates their alkalinity (5 grams of Thief carbon in 20 mL of deionised water). This experiment proves that the bromination of carbon enriched alkaline coal ash solids derived from partial coal combustion enhances their ability to capture mercury in combustion flue gas even at a low carbon injection dose of 0.37 lb/MMacf. This is a distinct advantage for purposes of fly ash recycling into blended cements and concrete.

Experiment 3

It has been discovered that the use of 3 ppmv of bromine gas in Canadian lignite coal combustion flue gas containing unhalogenated carbon rich alkaline coal ash solids, such as partially combusted Canadian lignite coal ash ("Thief carbon") obtained using the Pennline et al technique resulted in 70% and 58% mercury removal respectively from the flue gas across a fiberglass baghouse at an average baghouse temperature of 271-273° F. with and without bromine injection respectively at the same Thief carbon dose into the flue gas.

Applicants attribute the success of the current invention to the enhanced capture of mercury from flue gas via adsorption of mercury onto carbon rich coal ash solids, such as partially combusted, carbon enriched alkaline coal ash solid particles, exposed to a halogen atmosphere, such as molecular chlorine or bromine containing gas, ahead of a particulate collection device, for example a baghouse. We believe that by increasing the alkalinity of the carbon via its intimate contact with alkaline ash (lignite or subbituminous) we have increased the concentration of Lewis base sites to enhance mercury absorption in the presence of gas phase halogen or halogenated alkaline carbon. This represents an advancement over related technology. Furthermore, halogenation of alkaline carbon should be enhanced over non-alkaline carbon. Molecular halogens (e.g bromine) are electrophilic (electron scavenging). Alkaline carbon surfaces (e.g. phenoxides due to ionization of phenolic structures), hydrolysis of lactones etc. to phenoxides and carboxylates are more nucleophilic (electron donating) and therefore more reactive to electrophilic halogens.

We believe that these effects, either alone or in combination, are responsible for the unique performance of our invention over the related technology. The present invention is limited however only by the claims and not by the above-disclosed mechanism.

Numerous characteristics and advantages have been set forth in the foregoing description, together with details of structure and function. The novel features are pointed out in the appended claims. The disclosure, however, is illustrative only, and changes may be made in detail to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety. It is further noted that, as used in this specification, the singular forms "a," "an," and "the" include plural referents unless expressly and unequivocally limited to one referent.

We claim:

1. A method of treating combustion flue gas containing mercury, said method comprising the steps of:
    injecting a halogen into said flue gas; and
    injecting partially combusted, carbon enriched alkaline coal ash solid particles into said flue gas ahead of a particulate collection device, in order to adsorb at least a portion of the mercury.

2. The method of claim 1, wherein said partially combusted, carbon enriched alkaline coal ash solid particles have a carbon content of less than about 50% by weight and have an alkaline ash content of greater than about 50% of their weight.

3. The method of claim 2, wherein said partially combusted, carbon enriched alkaline coal ash solid particles have a carbon content of less than about 40% by weight and have an alkaline ash content of greater than about 60% of their weight.

4. The method of claim 1, wherein said halogen is a molecular halogen, a molecular or atomic halogen precursor, or a mixture thereof and is selected from the group consisting of chlorine, bromine and iodine.

5. The method of claim 2, wherein said molecular halogen includes chlorine or bromine.

6. The method of claim 2, wherein said molecular or atomic halogen precursor includes a halide.

7. The method of claim 2, wherein said molecular or atomic halogen precursor includes a hypohalite.

8. The method of claim 6, wherein said halide is a chloride.

9. The method of claim 6, wherein said halide is a bromide.

10. The method of claim 6, wherein said halide is an iodide.

11. The method of claim 7, wherein said hypohalite is a hypochlorite.

12. The method of claim 7, wherein said hypohalite is a hypobromite.

13. The method of claim 7, wherein said hypohalite is a hypoiodite.

14. The method of claim 1, wherein said alkaline carbon containing solid particles are alkaline coal ash particles.

15. The method of claim 14, wherein said alkaline coal ash particles are those derived from the partial combustion of lignite or subbituminous coal.

16. The method of claim 1, wherein said alkaline solid particles include those derived from the fusion of coal ash with alkali, an alkali flux, or mixtures thereof.

17. The method of claim 1, wherein said alkaline carbon containing solid particles are derived from partially combusted coal.

18. The method of claim 15, wherein said partially combusted coal includes subbituminous coal.

19. The method of claim 15, wherein said partially combusted coal includes lignite coal.

20. The method of claim 1, wherein said particulate collection device includes an electrostatic precipitator.

21. The method of claim 1, wherein said particulate collection device includes a baghouse or fabric filter.

22. The method of claim 1, further including passing treated flue gas through a flue gas desulphurization system FGD.

23. A method of treating coal combustion flue gas containing mercury, comprising the steps of
    exposing partially combusted, carbon enriched alkaline coal ash solid particles to a halogen containing atmosphere; and
    injecting said halogen atmosphere treated alkaline carbon containing solid particles into said flue gas ahead of a particulate collection device, thereby adsorbing at least a portion of the mercury.

24. A method of treating coal combustion flue gas containing mercury comprising the steps of:
    evaluating coal for chlorine levels;
    evaluating quality of thief coal; and
    injecting a halogen and thief coal into said flue gas ahead of a particulate collection device, in order to adsorb at least a portion of the mercury and into said flue gas when said chlorine levels and said ash quality is below a certain level.

25. The method of claim 22 wherein said evaluating quality of thief coal includes evaluating the pH of its ash on exposure to water.

26. A method for removing mercury from a flue gas created from the burning of lignite or subbituminous coals in a coal fired power plant, said method comprising the steps of:
    injecting a pulverized coal and air mixture into a combustion chamber;
    extracting a stream of semi-combusted pulverized coal and gas before said semi-combusted coal reaches the burner;
    separating said stream of semi-combusted pulverized coal and gases into a gas recycle stream and a thermally activated sorbent stream;
    cooling said thermally activated sorbent;
    injecting a halogen;
    contacting said thermally activated sorbent and said halogen with the flue gas at a location downstream from said combustion chamber; and
    collecting said thermally activated sorbent containing an amount of mercury removed from the flue gas in a particulate collection device.

27. The method of removing mercury according to claim 26, wherein said step of extracting said stream of semi-combusted pulverized coal and gas directly from a combustion zone before said semi-combusted coal reaches the burner is accomplished by inserting a hollow lance into said combustion zone and by applying suction to said hollow lance.

28. The method of removing mercury according to claim 26, wherein said step of extracting said stream of semi-combusted pulverized coal and gas directly from a combustion zone within said combustion chamber is by inserting a hollow lance into said combustion zone where a combustion zone temperature is in a range of between about 1000° F. and 3000° F.

29. The method of removing mercury according to claim 26, wherein said step of separating said stream of semi-combusted pulverized coal and gases into a gas recycle stream and a thermally activated sorbent stream is accomplished by directing said stream of semi-combusted pulverized coal and gases into a gas-solid separator.

30. The method of removing mercury according to claim 26, wherein said step of contacting said thermally activated sorbent and halogen with the flue gas at a location downstream from said combustion chamber is accomplished by injecting said sorbent and halogen into a duct containing said flue gas with a feed device.

31. The method of removing mercury according to claim 26, wherein the step of contacting said thermally activated sorbent and halogen with the flue gas at a location downstream from said combustion chamber within the power plant is conducted where a flue gas temperature is in a range of up to about 400° F.

32. A method of treating lignite coal- or subbituminous coal-generated combustion flue gas containing mercury, said method comprising the steps of:

determining the alkalinity of said coal;

injecting a halogen into said flue gas, said halogen being injected in an amount correlated to said determined alkalinity; and injecting partially combusted, carbon enriched alkaline coal ash solid particles into said flue gas ahead of a particulate collection device, thereby adsorbing at least a portion of said mercury.

33. The method of claim 32, wherein said halogen is a molecular halogen, a molecular or atomic halogen precursor, or a mixture thereof, and is selected from the group consisting of chlorine, bromine and iodine.

34. The method of claim 32, wherein said molecular or atomic halogen precursor includes a halide.

35. The method of claim 32, wherein said molecular or atomic halogen precursor includes a hypohalite.

36. The method of claim 34, wherein said halide is selected from the group consisting of chloride, bromide, iodide, and mixtures thereof.

37. The method of claim 35, wherein said hypohalite is selected from the group consisting of hypochlorite, hypobromite, hypoiodite, and mixtures thereof.

38. The method of claim 24, wherein said thief coal includes alkaline coal ash particles.

39. The method of claim 24, further including adjusting the alkalinity of said thief coal prior to its injection with alkaline solid particles derived from the fusion of coal ash with an alkali, an alkali flux, or mixture thereof.

40. The method of claim 32, further including passing treated flue gas through a flue gas desulphurization system FGD.

41. A method of treating lignite coal- or subbituminous coal-generated combustion flue gas containing mercury, said method comprising the steps of:

testing halogen levels of said coal determining the quality of said coal;

injecting a molecular halogen, an atomic halogen precursor, a halide, a hypohalite, or mixtures thereof into said flue gas in and ahead of a particulate collection device in an amount correlated to said halogen level or said coal quality, or both; and injecting thief carbon into said flue gas ahead of a particulate collection device, thereby optimizing the mercury reduction.

42. The method of claim 24 wherein said evaluating quality of thief coal includes evaluating pH.

43. A method for removing mercury from a flue gas created from the burning of lignite or subbituminous coals in a coal fired power plant, said method comprising the steps of:

injecting a pulverized coal and air mixture into a combustion chamber;

extracting a stream of semi-combusted pulverized coal and gas before said semi-combusted coal reaches the burner;

separating said stream of semi-combusted pulverized coal and gases into a gas recycle stream and a thermally activated sorbent stream;

cooling said thermally activated sorbent;

injecting a halogen;

contacting said thermally activated sorbent and said halogen with the flue gas at a location downstream from said combustion chamber; and collecting said thermally activated sorbent containing an amount of mercury removed from the flue gas in a particulate collection device.

44. The method of claim 43, wherein said extracting includes inserting a hollow lance into said combustion zone and by applying suction to said hollow lance.

45. The method of claim 43, wherein said extracting includes inserting a hollow lance into said combustion zone where a combustion zone temperature is in a range of between about 1000° F. and 3000° F.

46. The method of claim 45, wherein said separating includes directing said stream of semi-combusted pulverized coal and gases into a gas-solid separator.

47. The method of claim 43, wherein said contacting includes essentially simultaneously injecting said sorbent and said halogen into a duct containing said flue gas with at least one feed device.

48. The method of removing mercury according to claim 43, wherein said contacting includes contacting where a flue gas temperature is in a range of up to about 400° F.

* * * * *